United States Patent
Kim et al.

(10) Patent No.: US 11,071,109 B2
(45) Date of Patent: Jul. 20, 2021

(54) METHOD FOR SELECTIVELY OPERATING DUPLEX MODE IN WIRELESS COMMUNICATION SYSTEM AND COMMUNICATION APPARATUS FOR SAME

(71) Applicant: LG Electronics Inc., Seoul (KR)

(72) Inventors: Dongkyu Kim, Seoul (KR); Kwangseok Noh, Seoul (KR); Sangrim Lee, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 350 days.

(21) Appl. No.: 16/086,140

(22) PCT Filed: Aug. 1, 2016

(86) PCT No.: PCT/KR2016/008457
§ 371 (c)(1),
(2) Date: Sep. 18, 2018

(87) PCT Pub. No.: WO2017/159932
PCT Pub. Date: Sep. 21, 2017

(65) Prior Publication Data
US 2020/0305157 A1    Sep. 24, 2020

Related U.S. Application Data

(60) Provisional application No. 62/348,957, filed on Jun. 12, 2016, provisional application No. 62/309,974, filed on Mar. 18, 2016.

(51) Int. Cl.
H04W 72/04    (2009.01)
H04L 5/14    (2006.01)
H04W 74/08    (2009.01)

(52) U.S. Cl.
CPC ......... *H04W 72/0453* (2013.01); *H04L 5/14* (2013.01); *H04W 74/0833* (2013.01)

(58) Field of Classification Search
None
See application file for complete search history.

(56) References Cited

U.S. PATENT DOCUMENTS

2008/0273491 A1    11/2008    Han et al.
2009/0296609 A1*   12/2009    Choi ............... H04W 72/121
                                                        370/281
2014/0016524 A1    1/2014    Choi et al.
2014/0221034 A1    8/2014    Renko et al.
(Continued)

OTHER PUBLICATIONS

Ming Feng et al., 'Duplex mode selection and channel allocation for full-duplex cognitive femtocell networks', Wireless Communications and Networking Conference (WCNC), 2015 IEEE, pp. 1900-1905, Mar. 9, 2015, 8 pages.

(Continued)

*Primary Examiner* — Saba Tsegaye
(74) *Attorney, Agent, or Firm* — Fish & Richardson P.C.

(57) ABSTRACT

A method for a communication apparatus selectively operating a duplex mode in a wireless communication system may comprise the steps of: operating in a half-duplex radio (HDR) mode in a resource including a physical channel or a signal used for initial access prior to radio resource control (RRC) connection; and operating in a full duplex radio (FDR) mode after the initial access.

13 Claims, 15 Drawing Sheets

(56) References Cited

U.S. PATENT DOCUMENTS

2015/0003302 A1\* 1/2015 Ekpenyong ........... H04W 72/14
370/280
2015/0016318 A1 1/2015 Lee et al.
2016/0337107 A1\* 11/2016 Tabet ........................ H04L 5/16

OTHER PUBLICATIONS

International Search Report and Written Opinion in International Application No. PCT/KR2016/008457, dated Nov. 30, 2016, 19 pages.

\* cited by examiner

METHOD FOR SELECTIVELY OPERATING DUPLEX MODE IN WIRELESS COMMUNICATION SYSTEM AND COMMUNICATION APPARATUS FOR SAME

CROSS-REFERENCE TO RELATED APPLICATIONS

This application is a National Stage application under 35 U.S.C. § 371 of International Application No. PCT/KR2016/008457, filed on Aug. 1, 2016, which claims the benefit of U.S. Provisional Application No. 62/348,957, filed on Jun. 12, 2016, and U.S. Provisional Application No. 62/309,974, filed on Mar. 18, 2016. The disclosures of the prior applications are incorporated by reference in their entirety.

TECHNICAL FIELD

The present invention relates to a wireless communication, and more particularly, to a method of selectively operating a duplex mode in a wireless communication system and a communication apparatus therefor.

BACKGROUND ART

3GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms.

However, the legacy frame structure of 1 ms TTI is unable to satisfy the 1 ms data requirement latency. 5G aims to provide data latency reduced as much as 10 times compared to the legacy data latency.

Although 5G communication system requires a new frame structure to solve the abovementioned problem, the new frame structure has not been proposed yet.

DISCLOSURE OF THE INVENTION

Technical Tasks

A technical task of the present invention is to provide a method for a communication device to selectively operate a duplex mode in a wireless communication system.

Another technical task of the present invention is to provide a communication device selectively operating a duplex mode in a wireless communication system.

Technical tasks obtainable from the present invention are non-limited the abovementioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of selectively operating a duplex mode by a communication device in a wireless communication system, includes operating in an HDR (Half Duplex Radio) mode in a resource including a physical channel or a signal used for an initial access prior to an RRC (Radio Resource Control) connection, and operating in a FDR (Full Duplex Radio) mode after the initial access. The resource can include a resource for receiving a PRACH (Physical Random Access Channel). The resource may include a resource for transmitting a BCH (Broadcasting Channel). A prescribed frequency band contiguous to the resource for receiving the PRACH may be configured as a band capable of performing downlink transmission only. A prescribed frequency band contiguous to the resource for transmitting the BCH may be configured as a band capable of performing uplink reception only. A resource for receiving a PRACH or a resource for transmitting a BCH may be positioned at a frequency band corresponding to a center frequency in a total bandwidth. The prescribed frequency band may include a whole of remaining bands except a frequency band corresponding to a center frequency in a total bandwidth. The prescribed frequency band may include a whole of remaining bands except a frequency band corresponding to a center frequency in a total bandwidth. The resource may include a resource for transmitting a Primary Synchronization Signal (PSS), a Secondary Synchronization Signal (SSS), a Cell-specific Reference Signal (CRS), a Physical Control Format Indicator CHannel (PCFICH), a Physical Downlink Control Channel (PDCCH), or a Physical Downlink Shared Channel (PDSCH).

To further achieve these and other advantages and in accordance with the purpose of the present invention, according to a different embodiment, a communication device selectively operating a duplex mode in a wireless communication system includes an RF unit and a processor, the processor configured to control the RF module to operate in an HDR (Half Duplex Radio) mode in a resource including a physical channel or a signal used for an initial access prior to an RRC (Radio Resource Control) connection, the processor configured to control the RF unit to operate in a FDR (Full Duplex Radio) mode after the initial access. The resource may include a resource for receiving a PRACH (Physical Random Access Channel). The resource may include a resource for transmitting a BCH (Broadcasting Channel). A prescribed frequency band contiguous to the resource for receiving the PRACH may be configured as a band capable of performing downlink transmission only. A prescribed frequency band contiguous to the resource for transmitting the BCH may be configured as a band capable of performing uplink reception only. A resource for receiving a PRACH or a resource for transmitting a BCH may be positioned at a frequency band corresponding to a center frequency in a total bandwidth. The prescribed frequency band may include a whole of remaining bands except a frequency band corresponding to a center frequency in a total bandwidth.

Advantageous Effects

According to one embodiment of the present invention, it is able to enhance communication performance in next generation communication environment by making a duplex mode to be selectively operated.

According to one embodiment of the present invention, it is able to prevent interference by configuring a band adjacent to a zone, which includes a physical channel used for initial access prior to RRC connection, by uplink band or downlink band only, thereby enhancing communication performance.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
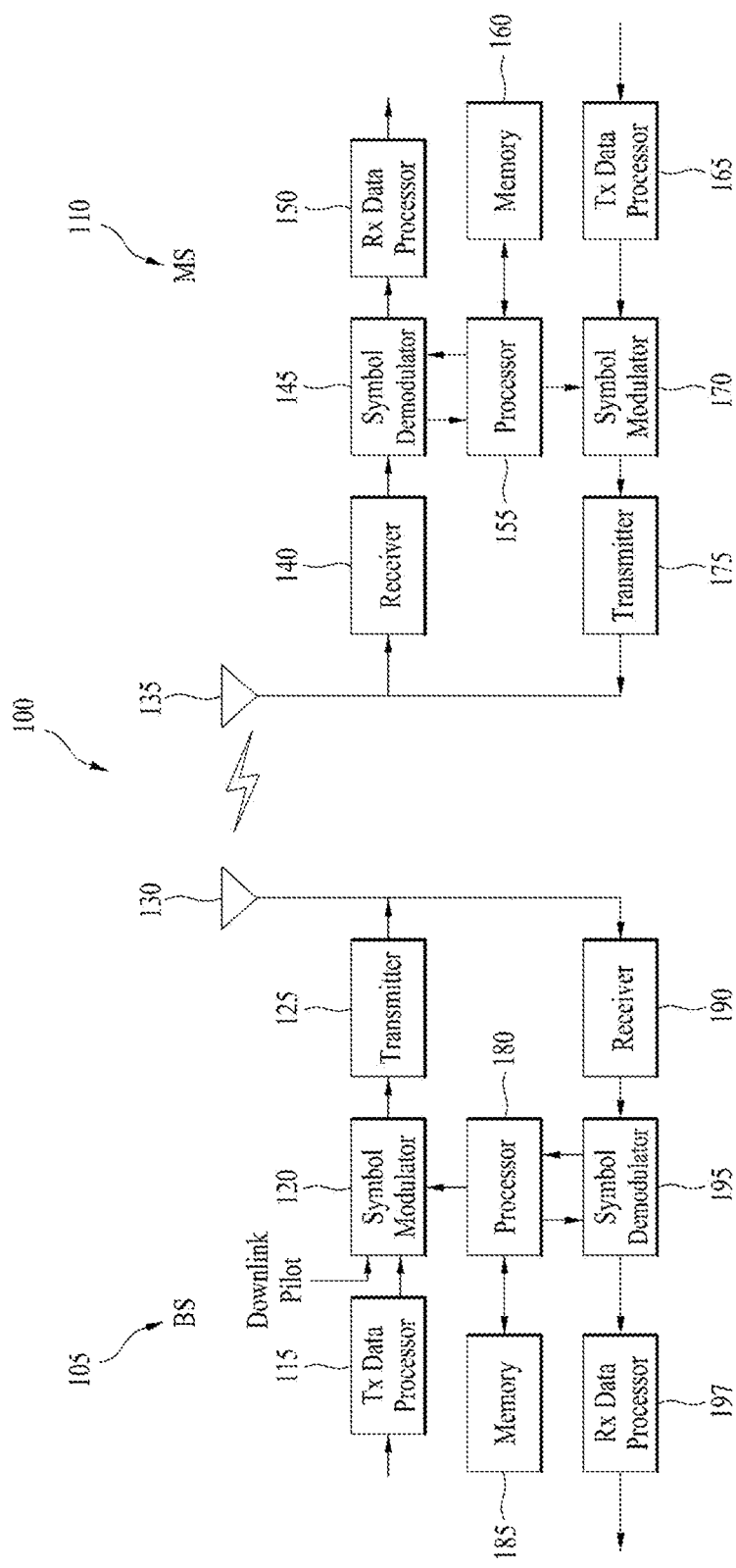
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

In case of performing wireless transmission between a base station and a UE, a transmission to the UE from the base station is commonly referred to as a DL transmission and a transmission to the base station from the UE is commonly referred to as a UL transmission. A scheme of determining a radio resource between the DL transmission and the UL transmission is defined as duplex. When a frequency band is divided into a DL transmission band and a UL transmission band and transmission and reception are performed in both directions, it is referred to as frequency division duplex (FDD).

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

And, the transmitter 125 and the receiver 190 of the base station 105 can be configured as an RF (Radio Frequency) unit. Similarly, the transmitter 175 and the receiver 140 of the user equipment 110 can be configured in a form of an RF unit.

The present invention proposes new and various frame structures for a $5^{th}$ generation (5G) communication system. In a next generation 5G system, scenarios can be classified into Enhanced Mobile BroadBand (eMBB), Ultra-reliable Machine-Type Communications (uMTC), Massive Machine-Type Communications (mMTC), and the like. The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, and massive connectivity (e.g., IoT).

Figure 2:
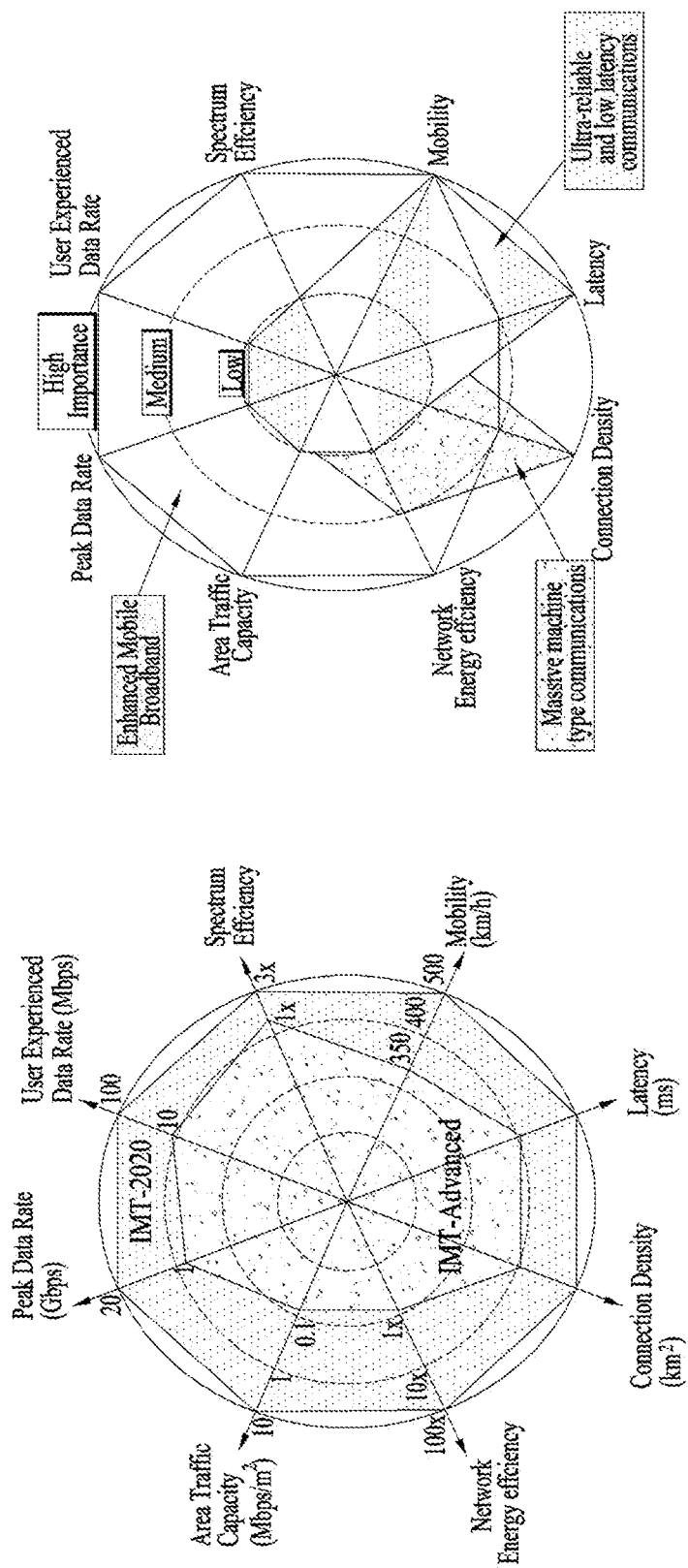
FIG. 2 is a diagram for explaining correlation between IMT 2020 core performance requirement for 5G and 5G performance requirement per service scenario.

FIG. 2 is a diagram for explaining correlation between IMT 2020 core performance requirement for 5G and 5G performance requirement per service scenario.

FIG. 2 illustrates correlation between core performance requirement for 5G proposed by IMT 2020 and 5G performance requirement per service scenario.

In particular, uMTC service has very high restriction on Over The Air (OTA) Latency Requirement and requires high mobility and high reliability (OTA Latency: <1 ms, Mobility: >500 km/h, BLER: <$10^{-6}$).

Figure 3:
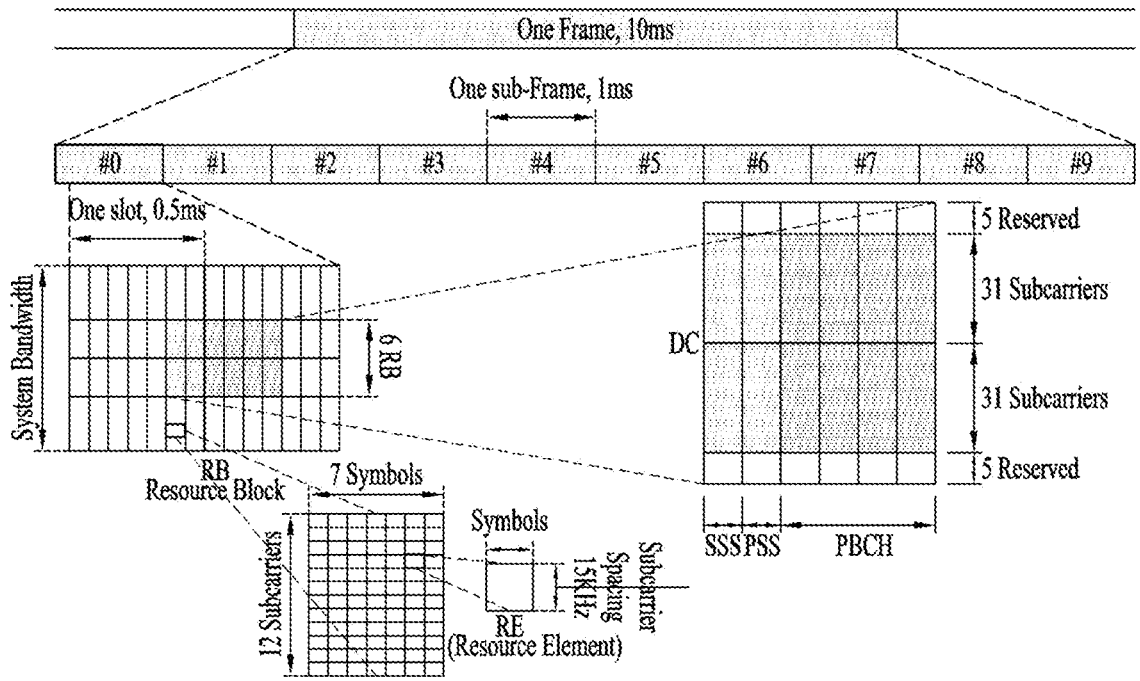
FIG. 3 is a diagram for LTE/LTE-A frame structure.

FIG. 3 is a diagram for LTE/LTE-A frame structure.

FIG. 3 shows a basic concept of a frame structure of LTE/LTE-A. One frame corresponds to 10 ms and includes 10 1-ms subframes. One subframe includes 2 0.5-ms slots and one slot includes 7 OFDM (Orthogonal Frequency Division Multiplexing) symbols. One resource block (RB) is defined by 12 subcarriers each of which has 15 kHz space and 7 OFDM symbols. A base station delivers a primary synchronization signal (PSS) and a secondary synchronization signal (SSS) for synchronization a physical broadcast channel (PBCH) for system information in a center frequency (6 RBs). In this case, it may have a difference in the frame structure and positions of the signal and the channel depending on a normal/extended CP (cyclic prefix) and TDD (Time Division Duplex)/FDD (Frequency Division Duplex).

Figure 4:
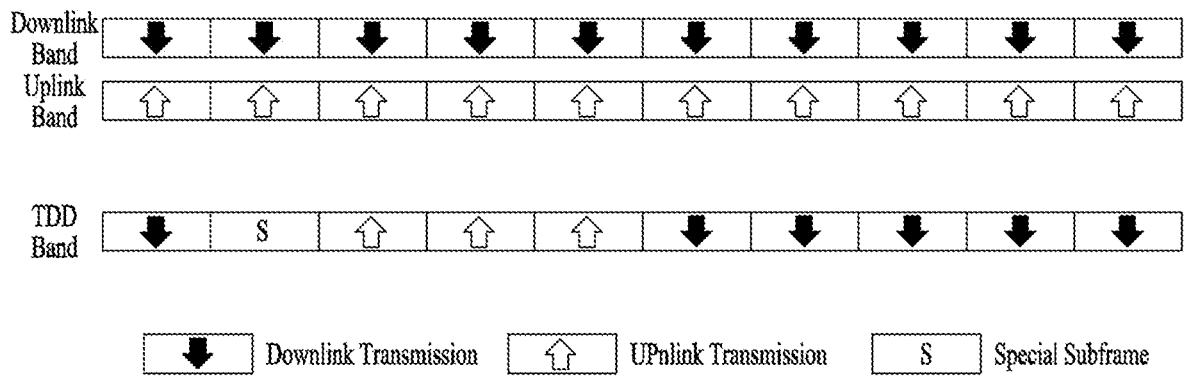
FIG. 4 is a diagram for an example of FDD/TDD frame structure in LTE/LTE-A system.

FIG. 4 is a diagram for an example of FDD/TDD frame structure in LTE/LTE-A system.

Referring to FIG. 4, in case of a FDD frame structure, a downlink frequency band is distinguished from an uplink frequency band. In case of a TDD frame structure, a downlink region is distinguished from an uplink region in a subframe unit in the same band.

Figure 5:
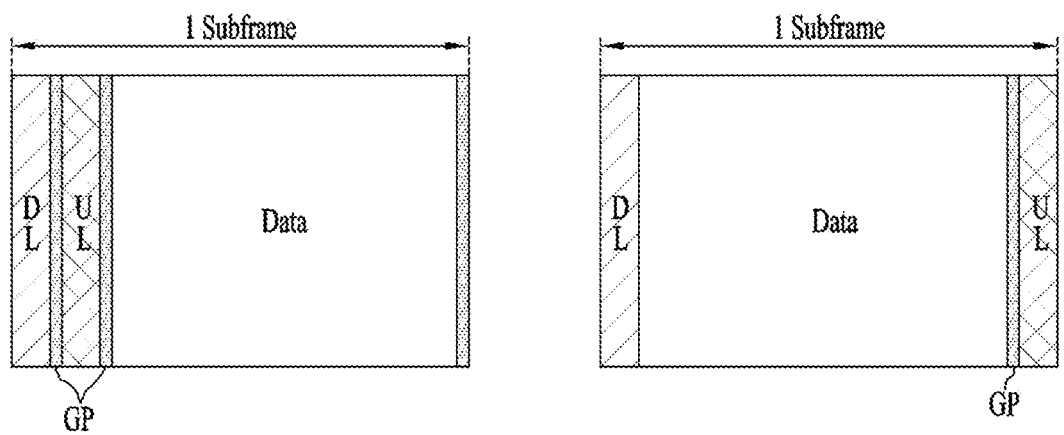
FIG. 5 is a diagram for an example of a self-contained subframe structure.

FIG. 5 is a diagram for an example of a self-contained subframe structure.

FIG. 5 illustrates a self-contained subframe structure which is proposed to satisfy a low-latency requirement among 5G performance requirements. A TDD-based self-contained subframe structure has a resource section for downlink, a resource section for uplink (e.g., a downlink control channel and an uplink control channel), a guard period (GP) for solving an interference issue between downlink and uplink, and a resource section for data transmission in a single subframe.

FIG. 5 (a) shows an example of a self-contained subframe structure. A subframe is configured in an order of a resource section for downlink, a resource section for uplink, and a resource section for data and a GP exists between the resource sections. In FIG. 5 (a), a downlink resource section represented as DL may correspond to a resource section for a downlink control channel and an uplink resource section represented as UL may correspond to a resource section for an uplink control channel.

FIG. 5 (b) shows a different example of a self-contained subframe structure. A subframe is configured in an order of a resource section for downlink, a resource section for data, and a resource section for uplink and a GP exists prior to the resource section for uplink only. In FIG. 5 (b), a downlink resource section represented as DL may correspond to a resource section for a downlink control channel and an uplink resource section represented as UL may correspond to a resource section for an uplink control channel.

In a 5G next generation system, V2X targeting ultra-low latency service, eMBB service targeting emergency service, machine control, and data speed, and the like are considered. In particular, it is necessary to design a frame structure capable of supporting low latency (OTA<1 ms) and high degree of freedom of DL/UL data. And, it is necessary to design a commonality-based frame structure which is not necessary to be redesigned in TDD or FDD operating method using a signal frame structure.

In order to provide low latency and degree of freedom of DL/UL data configuration in 5G next generation system, the present invention proposes a method of configuring a new frame structure and a control zone. In the present specification, such a term as a zone indicates a resource and the term can be used as the same meaning indicating 'region' or 'channel'.

An FDR (Frequency Duplex Radio) Tx/Rx system capable of simultaneously transmitting and receiving an uplink signal and a downlink signal on the same frequency band can increase frequency efficiency (spectral efficiency) as much as maximum double compared to a legacy system by dividing frequency or time, the FDR Tx/Rx system is regarded as one of core technologies of the 5G next generation mobile communication system.

Figure 6:
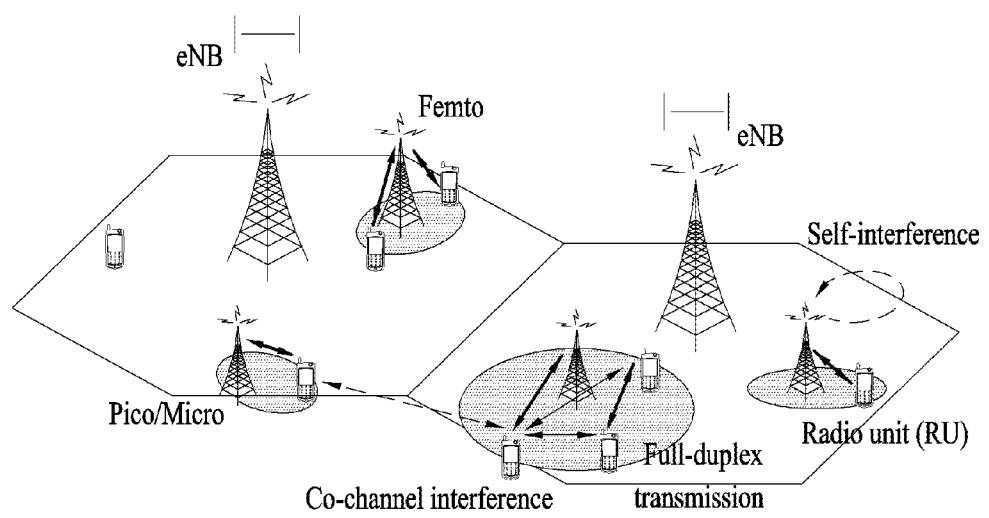
FIG. 6 is a conceptual view of a UE and a Base Station (BS) which support Full Duplex Radio (FDR)

FIG. 6 is a conceptual view of a UE and a Base Station (BS) which support Full Duplex Radio (FDR).

In the FDR situation illustrated in FIG. 1, the following three types of interference are produced.

Intra-Device Self-Interference:

Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE Inter-Link Interference:

An Uplink (UL) signal transmitted by a UE is received at an adjacent UE and thus serves as interference.

BS to BS Inter-Link Interference:

The BS to BS inter-link interference refers to interference caused by signals that are transmitted between BSs or heterogeneous BSs (pico, femto, and relay) in a HetNet state and received by an Rx antenna of another BS Among the three types of interference, the intra-device self-interference (hereinafter, self-interference (SI)) occurs in an FDR system only and considerably deteriorates performance of the FDR system. In order to manage the FDR system, it is necessary to preferentially solve the SI problem.

Figure 7:
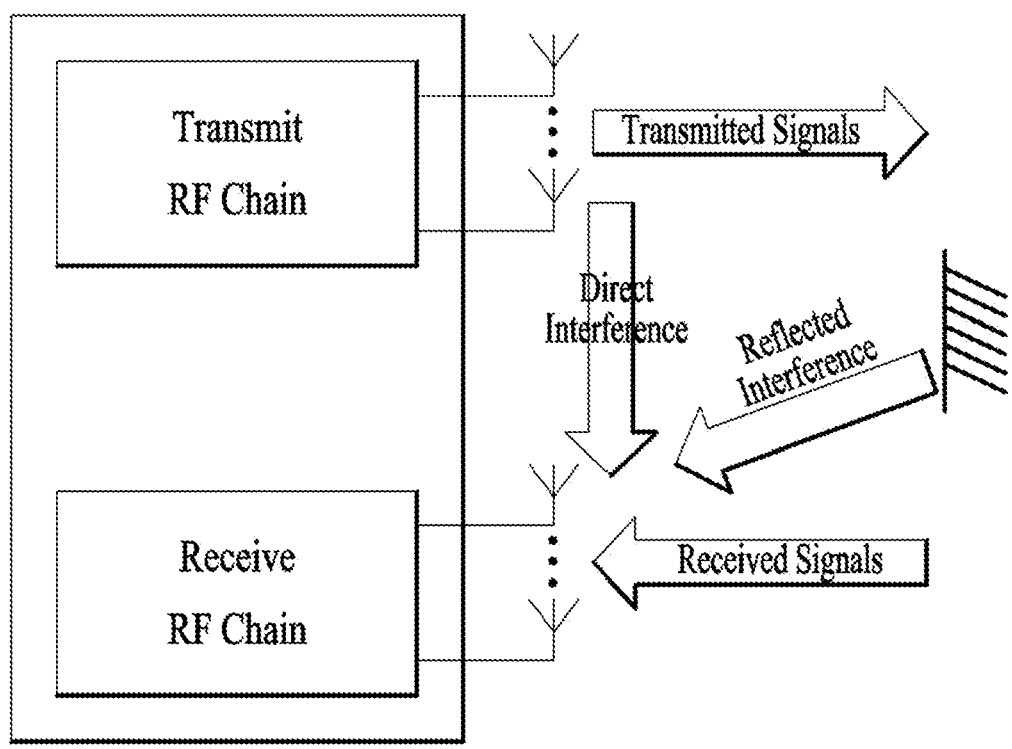
FIG. 7 is a diagram showing the concept of a transmission/reception link and self-interference (SI) in an FDR communication situation.

FIG. 7 is a diagram showing the concept of a transmission/reception link and self-interference (SI) in an FDR communication situation.

As shown in FIG. 7, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient SI cancellation is necessary to operate the FDR system.

To effectively operate the FDR system, self-IC requirements with respect to the maximum transmission power of devices (in the case where FDR is applied to a mobile communication system (BW=20 MHz)) may be determined as illustrated in [Table 1] below.

TABLE 1

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (forUE) | −92 dBm | 115 dB |

Referring to Table 1, it may be noted that to effectively operate the FDR system in a 20-MHz BW, a UE needs 119-dBm Self-IC performance. A thermal noise value may be changed to $N_{0,BW}$=−174 dBm+10×$\log_{10}$(BW) according to the BW of a mobile communication system. In Table 3, the thermal noise value is calculated on the assumption of a 20-MHz BW. In relation to Table 3, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 8:
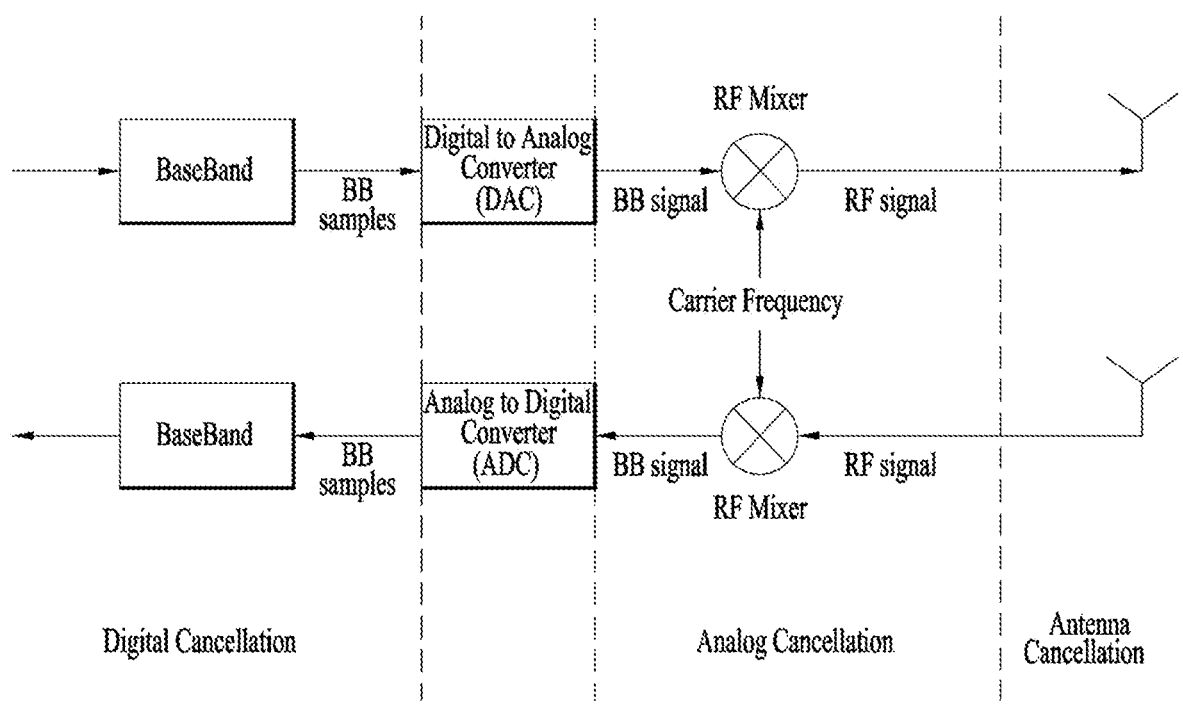
FIG. 8 is a view illustrating positions at which three Self-IC schemes are applied, at a Radio Frequency (RF) Tx and Rx end (or an RF front end) of a device.

FIG. 8 is a view illustrating positions at which three Self-IC schemes are applied, in a Radio Frequency (RF) Tx and Rx end (or an RF front end) of a device.

Now, a brief description will be given of the three Self-IC schemes.

Antenna Self-IC:

Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC:

Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC:

Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 9:
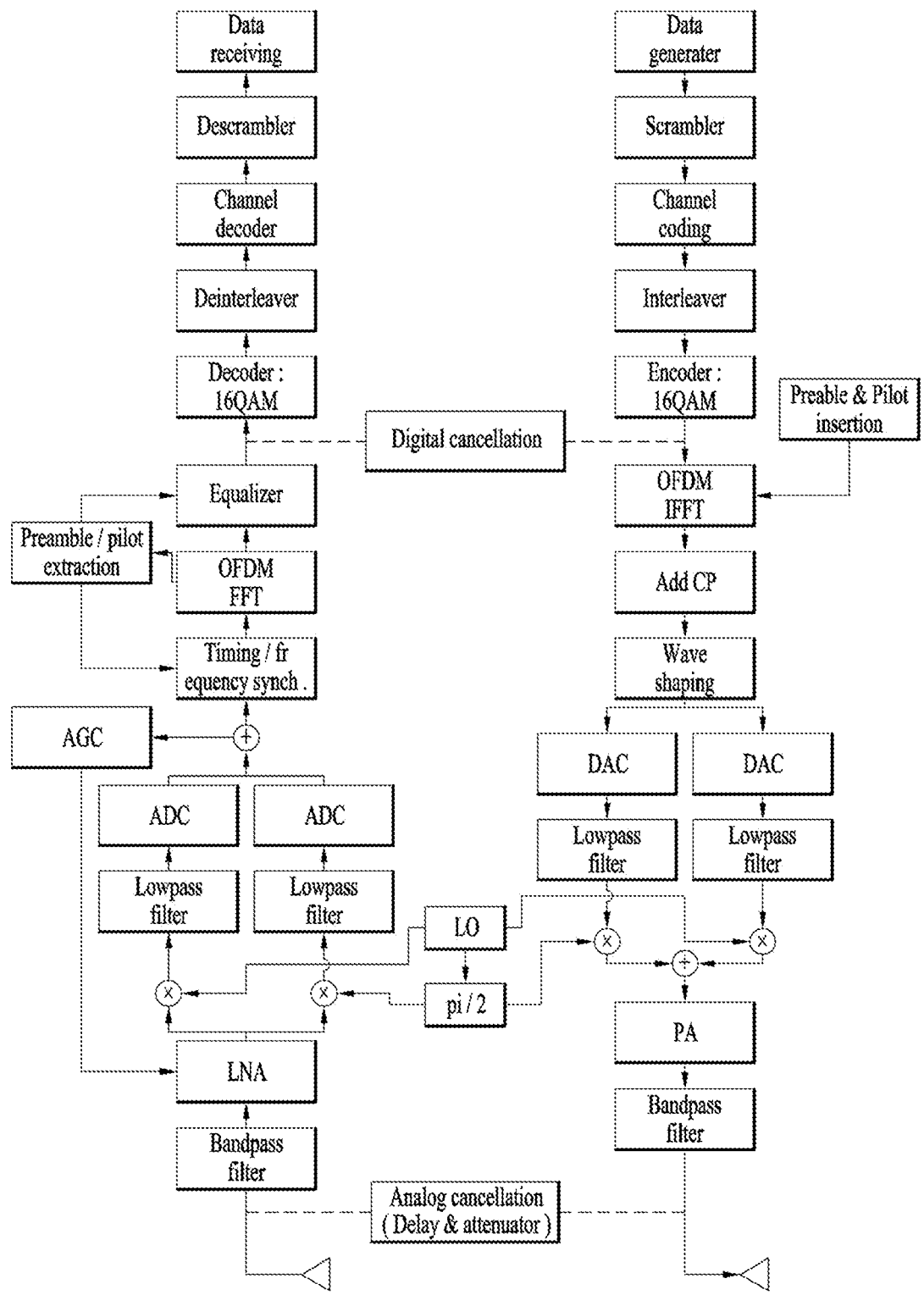
FIG. 9 is a block diagram of a Self-IC device in a proposed communication apparatus in an OFDM communication environment based on FIG. 8.

FIG. 9 is a block diagram of a Self-IC device in a proposed communication apparatus in an OFDM communication environment based on FIG. 8.

While FIG. 9 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 9 is a conceptual view of Self-IC though separation of a Tx antenna from an Rx antenna, if antenna Self-IC is performed using a single antenna, the antenna may be configured in a different manner from in FIG. 9. A functional block may be added to or removed from an RF Tx end and an RF Rx end shown in FIG. 9 according to a purpose.

In a self-contained subframe structure, it may be able to support FDR transmission to increase frequency efficiency and maximum transmission speed corresponding to the requirements of 5G New RAT system. However, so far, the development of the FDR technology has been focused on cancelling or managing interferences (self-interference, interference between devices) capable of being occurred at the time of operating the FDR. Hence, it is necessary to perform overall system development for operating FDR in 5G New RAT system.

In order to operate FDR in 5G New RAT system, it is necessary to preferentially perform initial access and RRC connection of a UE. When a UE operating FDR performs accessing, it is necessary to smoothly perform UE access for initial access and RRC connection. In particular, when a procedure, which is performed at the time of performing the initial access and the RRC connection of the UE, is performed, it is necessary to determine a clear duplex mode and a duplex mode on a physical channel included in the procedure.

When FDR transmission is performed in a self-contained subframe structure, the present invention proposes a method of transmitting broadcasting to all UEs prior to RRC connection, a method of forwarding specific system information to a group consisting of two or more UEs, and a method of determining whether or not a UE performing random access for initial access is accessed.

Embodiment 1

An embodiment 1 of the present invention proposes that a UE operates in an HDR mode in a time and a frequency resource region including physical channels and signals used for initial access prior to RRC connection.

As mentioned in the foregoing description, when a UE performs initial access, it is necessary to perform operations described in the following in all UEs irrespective of a duplex mode (operation in HDR mode or operation in FDR mode) of the UE. Contents and an order of the operations are described in the following. Following description is explained on the basis of an initial access procedure in LTE/LTE-A system. However, it is apparent that the proposed procedure is not restricted to the initial access procedure and can be applied to a different system.

Time and frequency synchronization
Physical cell ID (PCI) detection
Master Information Block (MIB) decoding: detecting system bandwidth and transmission mode
Channel estimation with Cell-specific RS
SIB decoding
Initial random access process As listed above, sequential processes involved in initial access prior to RRC connection use a plurality of physical channels and signals. As mentioned in the foregoing description, in order to make all UEs intending to perform initial access including not only a UE operating with FDR mode but also a UE operating with HDR mode only smoothly perform the initial access, the UEs should operate in the HDR mode in a time and a frequency resource region including the physical channels and the signals used in the sequential processes.

For example, in 4G LTE, LTE-A based frame structure, in order to perform a process for the initial access, it is necessary to have an entire region or a part of a region of physical channels and signals described in the following.

Primary Synchronization Signal (PSS), Secondary Synchronization Signal (SSS)
Physical Broadcasting CHannel (PBCH)
Cell-specific Reference Signal (CRS)
Physical Control Format Indicator CHannel (PCFICH)
Physical Downlink Control Channel (PDCCH)
Physical Downlink Shared Channel (PDSCH)
Physical Random Access CHannel (PRACH)

In particular, in a frame structure of LTE/LTE-A system, a time resource region and a frequency resource region including an entire region or a partial region of the listed physical channels and the signal, which are essential for initial access of a UE, are restricted not by full duplex transmission but by half duplex transmission. By doing so, it may be able to enable all UEs intending to perform initial access to smoothly perform the initial access. This is illustrated in FIG. 10.

Figure 10:
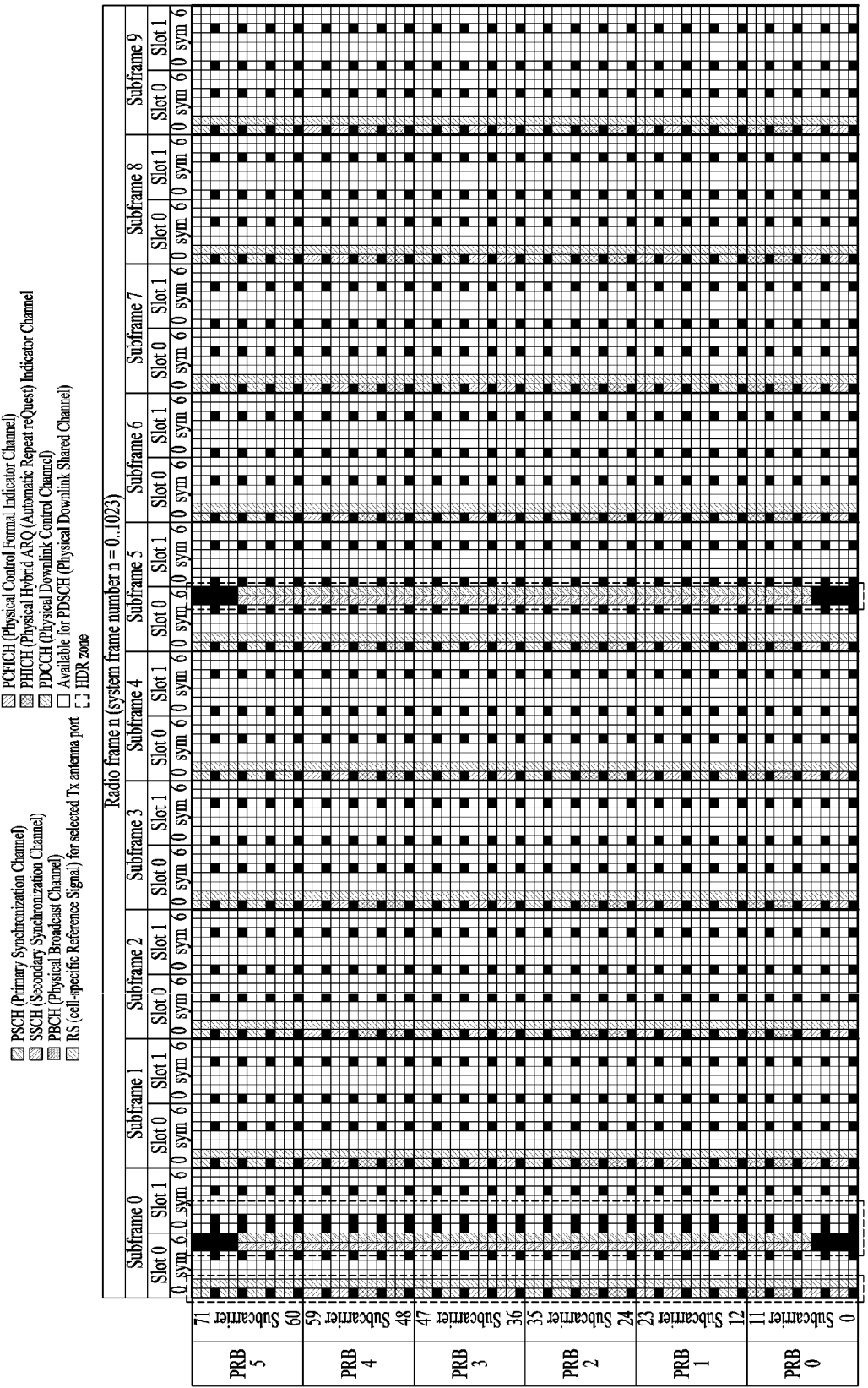
FIG. 10 is a diagram for explaining an example of an FDR/HDR mode according to a symbol in LTE/LTE-A frame structure.

FIG. 10 is a diagram for explaining an example of an FDR/HDR mode according to a symbol in LTE/LTE-A frame structure.

A time and a frequency resource region (HDR zone: box of dotted line) operating in a half-duplex transmission mode are explained in detail in the following according to the example of FIG. 10. A PSS and an SSS are respectively included in resource regions included in a $6^{th}$ symbol and a $7^{th}$ symbol of a subframe 0 and a subframe 5 of each frame.

A PBCH is respectively included in resource regions included in an $8^{th}$ symbol, a $9^{th}$ symbol, a $10^{th}$ symbol, and an $11^{th}$ symbol of a subframe 0 of each frame. A first symbol of a subframe 0 of each frame includes PCFICH and 16 CCEs corresponding to a common search space of a control channel can be included in the first symbol of each subframe. A resource region included in a partial symbol of PDSCH in which SIB is included and a resource region included in a partial symbol of PDCCH indicating the resource region are included in a subframe.

And, a resource region included in a symbol in which PRACH is included and a resource region included in a partial symbol of PDSCH in which a random access response message (RARM) is included can be included in a frame.

As a different example, in a 5G New RAT frame structure, a time resource region and a frequency resource region including an entire region or a partial region of the listed physical channels and the signal, which are essential for initial access of a UE, are restricted not by full duplex transmission but by half duplex transmission. By doing so, it may be able to enable all UEs intending to perform initial access to smoothly perform the initial access. In particular, in 5G New RAT frame structure, it is necessary for the time resource region and the frequency resource region including an entire region or a partial region of the listed physical channels and the signal, which are essential for initial access of a UE, to be restricted not by full duplex transmission but by half duplex transmission. This can be illustrated based on an example of a self-contained frame structure.

Figure 11:
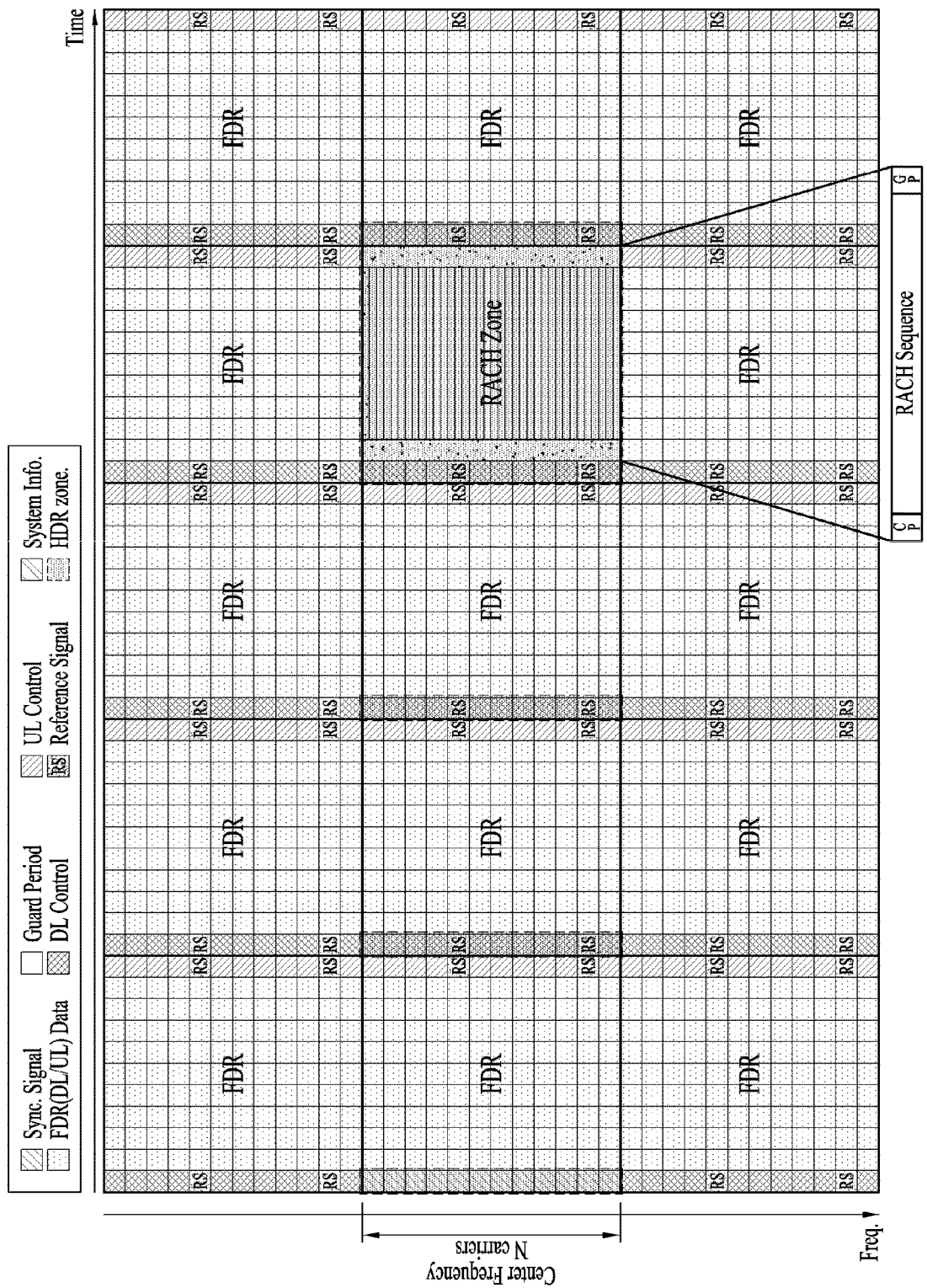
FIG. 11 is a diagram for explaining an example of an FDR/HDR mode according to a symbol in a self-contained frame structure.

FIG. 11 is a diagram for explaining an example of an FDR/HDR mode according to a symbol in a self-contained frame structure.

A time and a frequency resource region (HDR zone: box of dotted line) operating in a half-duplex transmission mode are explained in detail in the following according to the example of FIG. 11. A time and a frequency resource region including a synchronization signal of each frame, a time and a frequency resource region including a PBCH of each frame, a time and a frequency resource region including a PCFICH, a time and a frequency resource region including 16 CCEs corresponding to a common search space of a control channel of each subframe, a partial time and a frequency resource region of PDCCH capable of including SIB, and a partial time and frequency resource region of PDCCH can be included in a HDR zone.

And, it is necessary to operate in an HDR mode in a time and a frequency resource region (in FIG. 11, represented as RACH zone) including PRACH and a partial time and frequency resource region of PDSCH including a random access response message (RARM) in a RACH procedure. Since discussion on a frame structure of 5G system is in progress, positions of the time and the frequency resource region can be changed according to the change of the frame structure.

Besides the proposed embodiment, it is necessary to configure a duplex mode by a half-duplex transmission mode only in the time and the frequency resource region including the physical channels and the signal in frame structures of various systems operating in FDR mode.

Embodiment 2

The embodiment 2 of the present invention proposes a method of configuring a full-duplex transmission banning band and a method of operating in HDR mode on the entire band of a corresponding symbol to operate in half-duplex mode on an adjacent band in consideration of in-band emission among a time and a frequency resource including physical channels and a signal used for initial access prior to RRC connection.

In LTE/LTE-A system, only 6 PRBs positioned over 1.4 MHz corresponding to the minimum band on the basis of a center frequency are used for initial access. Hence, a band after 6 PRBs is not used for initial access.

In-band emission may occur on an adjacent band operating in FDR mode according to self-interference cancellation capability of a communication device (e.g., a base station and a UE) equipped with FDR capability. In case of using FDR mode on an adjacent band of a time and a frequency resource including physical channels and signals used for initial access, interference may occur in the time and the frequency resource including the physical channels and the signals used for initial access.

In particular, as mentioned in the foregoing description, if the duplex mode, which is operating on the entire band of a symbol including the physical channels and the signals used for initial access, is set to a half-duplex mode, it is able to minimize interference capable of being occurred at the time of performing the initial access. A method of minimizing interference is explained in detail in the following. First of all, (1) it may be able to configure a full-duplex transmission banning band to operate in half-duplex mode on an adjacent band in consideration of in-band emission among a time and a frequency resource including physical channels and a signal used for previous initial access. (2) It may be able to configure an operation to be performed on the entire band of a symbol including physical channels and signals used for previous initial access in HDR mode. Among the methods (1) and (2), the method (1) may change a size of the full-duplex transmission banning band operating in half-duplex transmission mode according to self-interference cancellation capability of a base station and a UE equipped with FDR capability.

Embodiment 3

The embodiment 3 of the present invention proposes a method of configuring a full-duplex transmission banning band and a method of operating in HDR mode on the entire band of a corresponding symbol to operate in half-duplex mode on an adjacent band in consideration of non-linear self-interference signal component among a time and a frequency resource including physical channels and a signal used for initial access prior to RRC connection.

As mentioned in the foregoing description, in LTE/LTE-A system, only 6 PRBs positioned over 1.4 MHz corresponding to the minimum band on the basis of a center frequency are used for initial access. Hence, a band after 6 PRBs is not used for initial access. In case of 5G New RAT system, the N number of PRBs on the basis of a center frequency or the N number of PRBs corresponding to a partial band of the entire band can be used for performing initial access. In particular, a band rather than the partial band is not used for initial access. However, a non-linear self-interference component (i.e., $3^{rd}$ Intermodulation distortion (IMD) component may occur on an adjacent band operating in FDR mode according to self-interference cancellation capability of a base station and a UE equipped with FDR capability. If interference occurs on a band adjacent to a time and a frequency resource including physical channels and signals used for initial access, a problem may occur at the time of performing the initial access due to the interference. In particular, it is highly probable that interference occurs from an adjacent band due to resource allocation on a broadcasting channel (BCH) operating on a physical shared channel and a random access channel (RACH).

Unlike a guard band in emission of the embodiment 2 (in general, several subcarriers are sufficient), if a non-linear self-interference component is generated due to duplex of an adjacent band, it is impossible to cancel interference.

In particular, as mentioned in the foregoing description, if the duplex mode, which is operating on the entire band of a symbol including the physical channels and the signals used for initial access, is set to a half-duplex mode, it may be able to set a limit on interference capable of being occurred at the time of performing the initial access. A method of setting a limit on the interference is described in the following. (1) It may be able to configure a DL/UL only band corresponding to a full-duplex transmission banning band to operate in half-duplex mode on an adjacent band in consideration of non-linear self-interference among a time and a frequency resource including physical channels and a signal used for previous initial access. (2) It may be able to configure an operation to be performed in DL or UL only on the entire band of a symbol including physical channels and signals used for previous initial access using a HDR mode operation.

Embodiment 3-1

Figure 12:
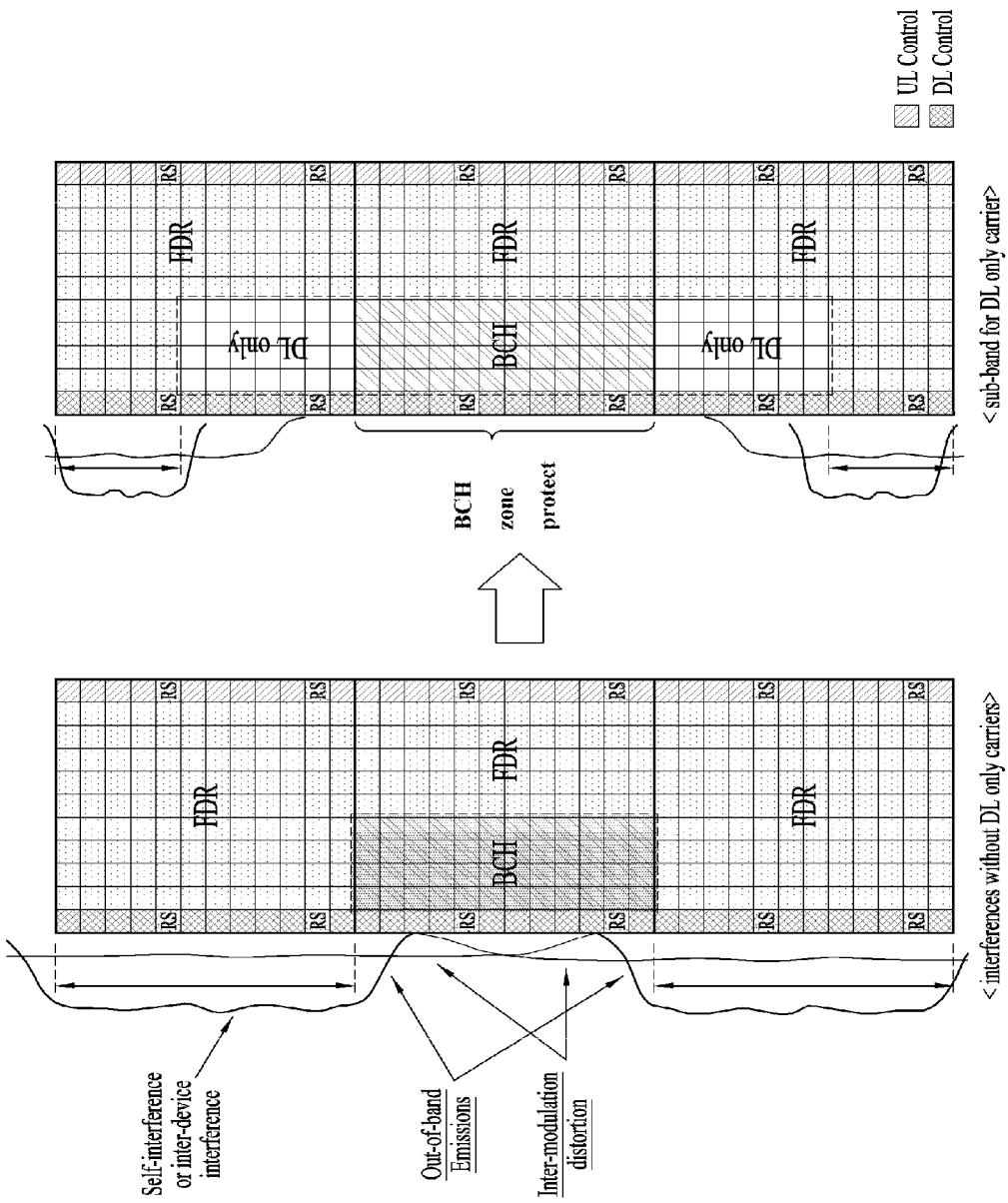
FIG. 12 is a diagram illustrating a method for preventing interference when a UE receives BCH.

FIG. 12 is a diagram illustrating a method for preventing interference when a UE receives BCH.

As shown in FIG. 12, as a specific embodiment of the embodiment 3, if a UE receives PBCH in a BCH zone, interference occurs from an uplink carrier (or uplink subcarrier) of a neighboring UE. Hence, it is necessary to protect the BCH zone. To this end, a frequency band adjacent to the BCH zone can be configured as a downlink band only (e.g., DL only carrier). As shown in the left of FIG. 12, interference occurs in a BCH zone due to a non-linear component of self-interference. In order to protect the BCH zone, if a channel adjacent to the BCH zone is configured as a DL only carrier, it is able to prevent interference when a BCH is received by a UE.

Embodiment 3-2

Figure 13:
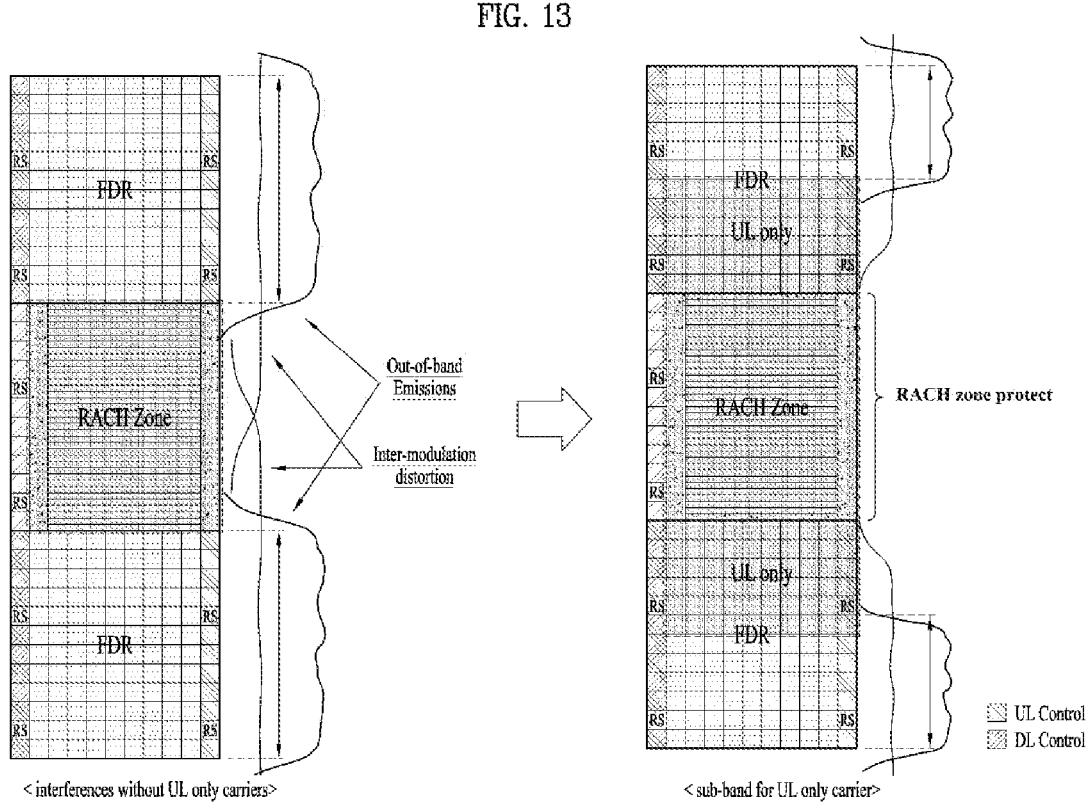
FIG. 13 is a diagram illustrating a method for preventing interference when RACH is received.

FIG. 13 is a diagram illustrating a method for preventing interference when RACH is received.

When a base station receives PRACH, self-interference may occur from a downlink carrier of the base station. Hence, it is necessary to protect a RACH zone. To this end, a frequency band adjacent to the RACH zone can be configured as an uplink transmission band only (e.g., UL only carrier). As shown in the left of FIG. 13, self-interference occurs in the RACH zone due to a non-linear component of self-interference. In order to protect the RACH zone, if a channel adjacent to the RACH zone is configured as a UL only carrier, it is able to prevent interference when a RACH is received by a base station.

In the embodiments 3-1 and 3-2, a subband size of the DL only carrier and a subband size of the UL only carrier can be determined in consideration of an amount of interference capable of being occurred in a system. If the most conservative subband size is configured, a DL/UL only carrier region of a size identical to a size of a FDR region can be configured. The size of the DL/UL only carrier can be controlled according to a position of a neighboring UE performing uplink and antenna/analog self-interference cancellation performance capable of cancelling self-interference.

Embodiment 3-3

Figure 14:
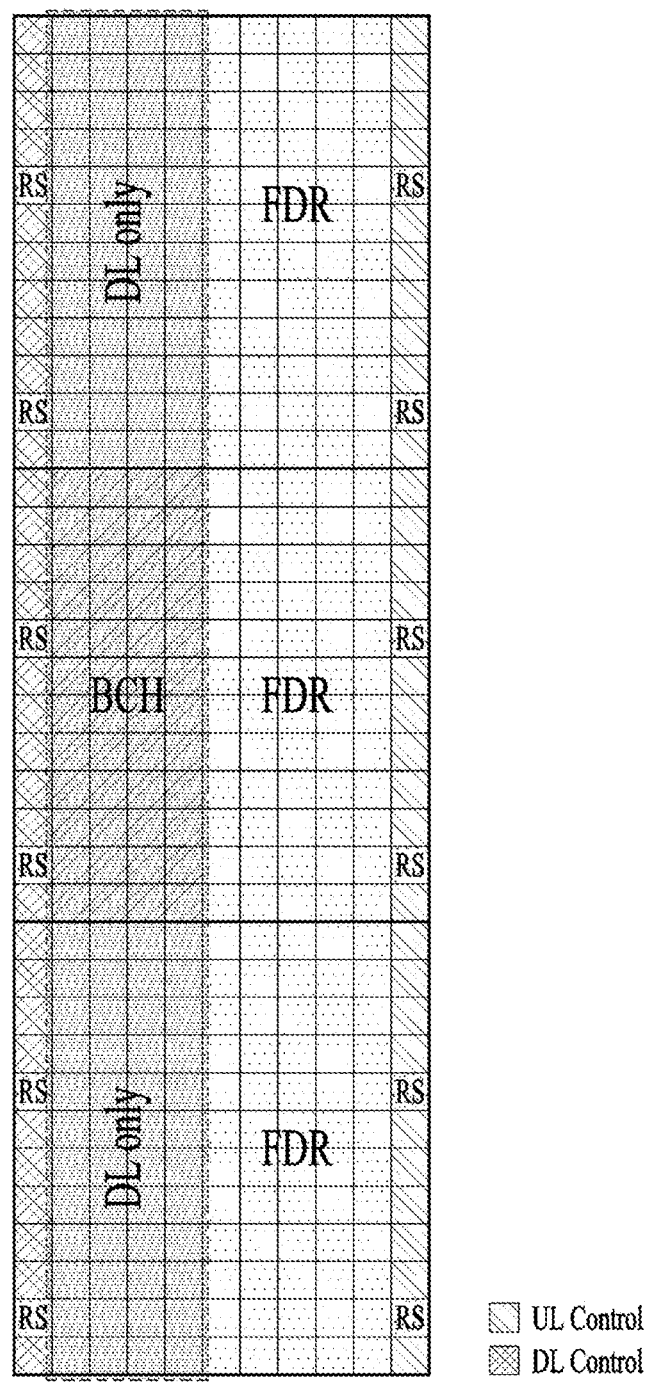
FIG. 14 is a diagram illustrating a method for preventing interference when BCH is received.

FIG. 14 is a diagram illustrating a method for preventing interference when BCH is received When a UE receives PBCH, in order to prevent interference from an uplink carrier (or uplink subcarrier) of a neighboring UE, i.e., in order to protect a BCH zone, as shown in FIG. 14, the entire band of symbols of the BCH zone except the BCH zone can be configured by a downlink transmission band (or DL only carrier) only.

As mentioned in the foregoing description, interference occurs in the BCH zone due to a non-linear component of the interference. In order to protect the BCH zone, if the entire band of symbols of the BCH zone is configured by a downlink transmission band (DL only carrier) only, it is able to prevent interference.

Embodiment 3-4

Figure 15:
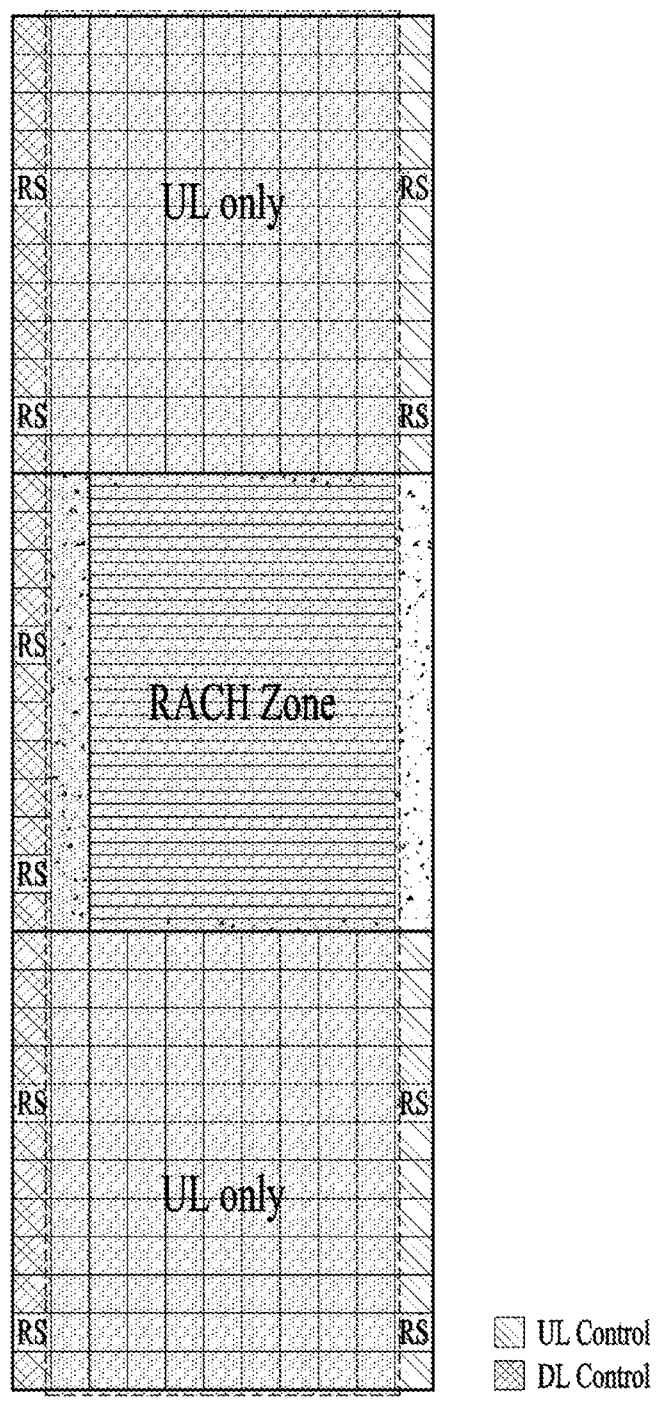
FIG. 15 is a diagram illustrating a method for preventing interference when RACH is received.

FIG. 15 is a diagram illustrating a method for preventing interference when RACH is received.

When a base station receives PRACH, in order to prevent self-interference from a downlink carrier (or downlink subcarriers) of the base station, in particular, in order to protect a RACH zone, the entire band of symbols of the RACH zone except the RACH zone can be configured by an uplink transmission band (or UL only carrier) only.

As mentioned in the foregoing description, self-interference occurs in the RACH zone due to a non-linear component of the self-interference. In order to protect the RACH zone, if the entire band of symbols of a channel adjacent to the RACH zone is configured by an uplink transmission band (UL only carrier) only, it is able to prevent interference when the base station receives RACH.

Figure 16:
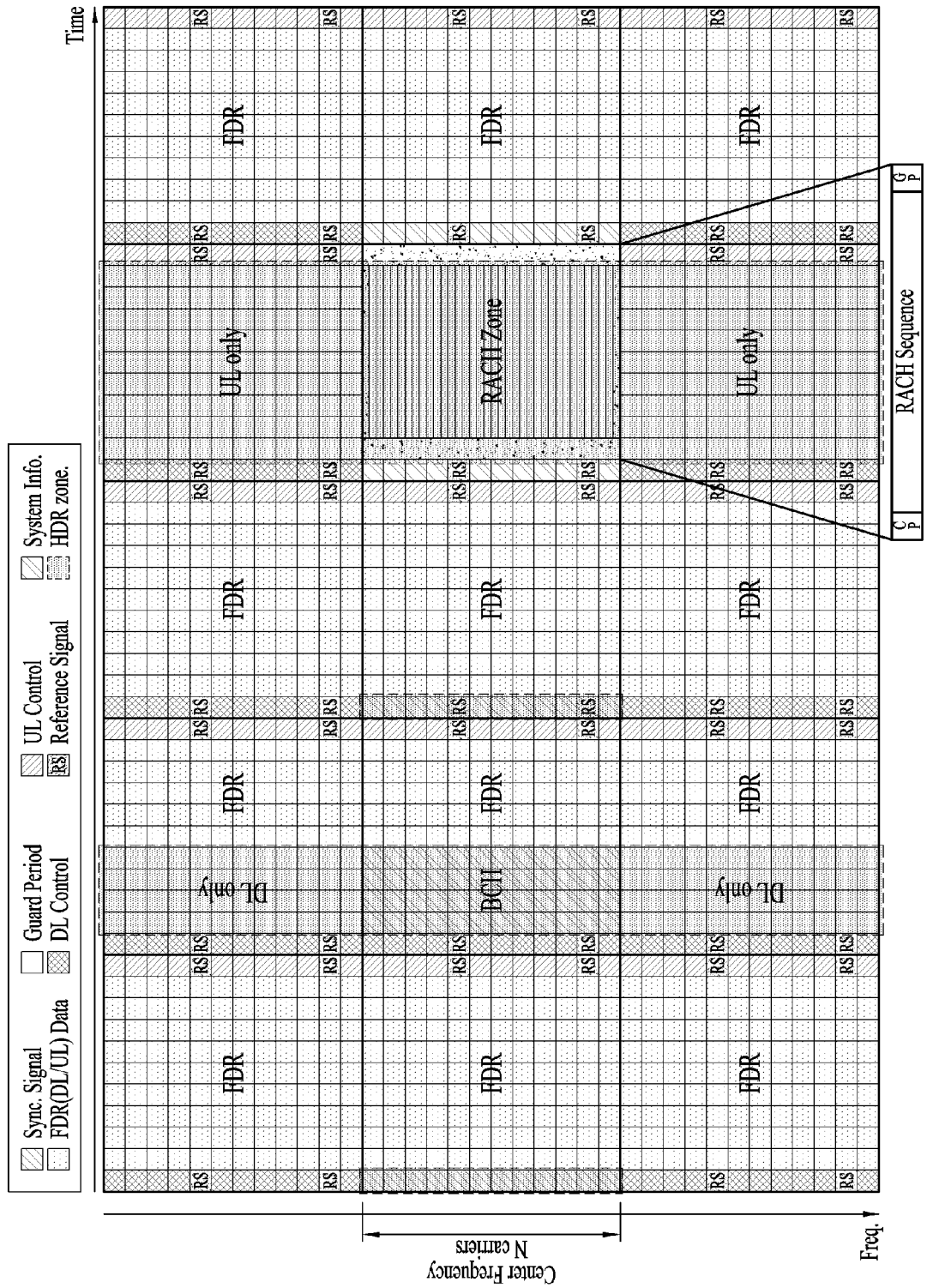
FIG. 16 is a diagram for an example of the entire frame structure based on embodiments 3-3 and 3-4.

FIG. 16 is a diagram for an example of the entire frame structure based on embodiments 3-3 and 3-4.

FIG. 16 illustrates the total frame structure of 5G New RAT configured by the embodiment 3-3 and the embodiment 3-4.

Referring to FIG. 16, a data region may operate in FDR mode in a specific subframe. In a subframe to which a BCH zone is allocated, the entire band of corresponding symbols of the BCH zone is configured by a downlink transmission band (DL only) only except the BCH zone. By doing so, it is able to prevent uplink interference of a neighboring UE when a UE receives BCH.

When a base station receives PRACH in a specific subframe to which RACH zone is allocated, in order to prevent self-interference from a downlink carrier (or downlink subcarriers) of the base station, in particular, in order to protect the RACH zone, the entire band of corresponding symbols of the RACH zone can be configured by an uplink transmission band (UL only) only except the RACH zone.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of selectively operating a duplex mode in a wireless communication system and a device therefor can be applied to various wireless communication systems including 3GPP LTE/LTE-A, 5G system, and the like.

What is claimed is:

1. A method for selectively operating a duplex mode by a communication device in a wireless communication system, the method comprising:
   operating in an Half Duplex Radio (HDR) mode in a resource containing a physical channel or a signal used for an initial access prior to an Radio Resource Control (RRC) connection; and
   operating in a Full Duplex Radio (FDR) mode after the initial access,
   wherein the resource contains a resource for receiving a Physical Random Access Channel (PRACH), and
   wherein a prescribed frequency band contiguous to the resource for receiving the PRACH is configured as a band capable of performing downlink transmission only.

2. The method of claim 1, wherein the resource contains a resource for transmitting a Broadcasting Channel (BCH).

3. The method of claim 2, wherein a prescribed frequency band contiguous to the resource for transmitting the BCH is configured as a band capable of performing uplink reception only.

4. The method of claim 3, wherein the prescribed frequency band contains a whole of remaining bands except a frequency band corresponding to a center frequency in a total bandwidth.

5. The method of claim 1, wherein a resource for receiving a PRACH or a resource for transmitting a BCH is positioned at a frequency band corresponding to a center frequency in a total bandwidth.

6. The method of claim 1, wherein the prescribed frequency band contains a whole of remaining bands except a frequency band corresponding to a center frequency in a total bandwidth.

7. The method of claim 1, wherein the resource contains a resource for transmitting a Primary Synchronization Signal (PSS), a Secondary Synchronization Signal (SSS), a Cell-specific Reference Signal (CRS), a Physical Control Format Indicator CHannel (PCFICH), a Physical Downlink Control Channel (PDCCH), or a Physical Downlink Shared Channel (PDSCH).

8. A communication device configured to selectively operate a duplex mode in a wireless communication system, the communication device comprising:
a transceiver; and
a processor,
wherein the processor configured to control:
the transceiver to operate in an Half Duplex Radio (HDR) mode in a resource containing a physical channel or a signal used for an initial access prior to an RRC (Radio Resource Control) connection; and
the transceiver to operate in Full Duplex Radio (FDR) mode after the initial access,
wherein the resource contains a resource for receiving a Physical Random Access Channel (PRACH), and
wherein a prescribed frequency band contiguous to the resource for receiving the PRACH is configured as a band capable of performing downlink transmission only.

9. The communication device of claim 8, wherein the resource contains a resource for transmitting a Broadcasting Channel (BCH).

10. The communication device of claim 9, wherein a prescribed frequency band contiguous to the resource for transmitting the BCH is configured as a band capable of performing uplink reception only.

11. The communication device of claim 8, wherein a resource for receiving a PRACH or a resource for transmitting a BCH is positioned at a frequency band corresponding to a center frequency in a total bandwidth.

12. The communication device of claim 8, wherein the prescribed frequency band contains a whole of remaining bands except a frequency band corresponding to a center frequency in a total bandwidth.

13. The communication device of claim 8, wherein the resource contains a resource for transmitting a Primary Synchronization Signal (PSS), a Secondary Synchronization Signal (SSS), a Cell-specific Reference Signal (CRS), a Physical Control Format Indicator CHannel (PCFICH), a Physical Downlink Control Channel (PDCCH), or a Physical Downlink Shared Channel (PDSCH).

* * * * *